Patented Nov. 18, 1952

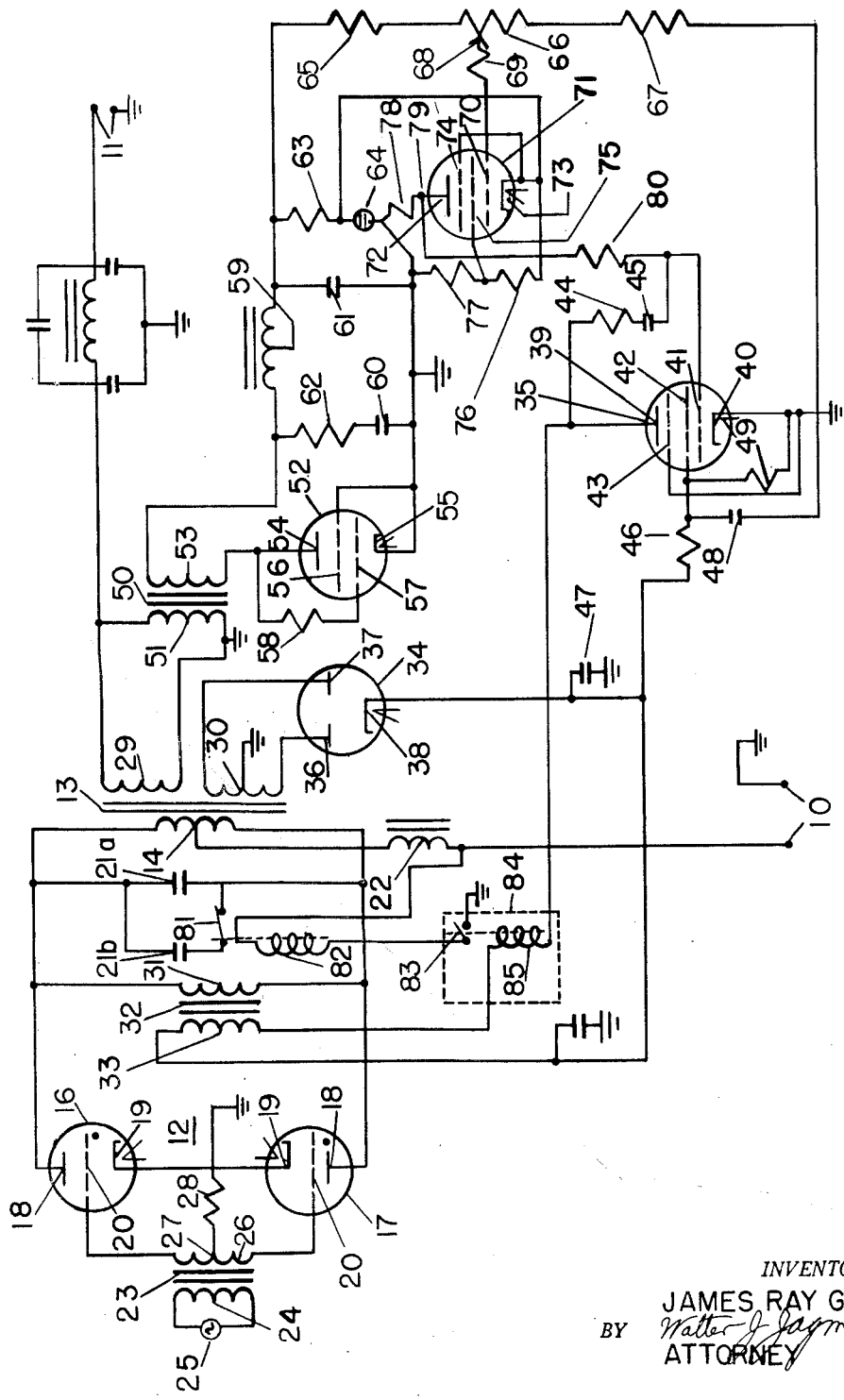
INVENTOR.
JAMES RAY GILMER
BY Walter J. Jagmin
ATTORNEY

2,618,774

UNITED STATES PATENT OFFICE 2,618,774

ELECTRIC TRANSLATING SYSTEM

James Ray Gilmer, Garland, Tex.

Application May 5, 1951, Serial No. 224,813

13 Claims. (Cl. 321—36)

This invention relates to electric translating systems and more particularly to electric translating systems for energizing an alternating current load circuit from a direct current supply circuit.

Electric translating systems which transmit energy from a direct current supply circuit to an alternating current load circuit and which employ a saturable reactor as means for regulating the voltage in the alternating current load circuit are known in the art. Such systems employ a transformer, a capacitor connected across the primary winding of the transformer, and electric valves connected between the direct current supply circuit and the primary winding. The reactive winding of the saturable reactor is usually connected across the primary winding and the saturating winding is connected to a source of direct current, the amount of current in the saturating winding being controlled by a suitable current regulating circuit. The amount of current in the saturating current varies inversely as the voltage of the alternating current load circuit to maintain the voltage substantially constant. It is found that very large currents are transmitted to the saturating winding during certain operating conditions, e. g., when the electric translating system is started under no load. The saturable reactor must, therefore, be of sufficiently large size to accommodate such heavy currents without suffering damage. In many applications where the weight of, and the space occupied by, the apparatus are of critical importance, as in aircraft installations, it is desirable to make the saturable reactor of as small weight and size as possible. The minimum weight and size of the saturable reactor should be fixed by relatively small saturating currents it must draw during conditions of normal operation and not by the large saturating currents it must draw during conditions of abnormal operation.

Accordingly, it is an object of the invention to provide a new and improved electric translating system.

It is another object of this invention to provide a new and improved electric translating system for transmitting energy from a direct current supply circuit to a constant voltage alternating current load circuit.

It is a further object of this invention to provide a new and improved electric translating system for transmitting energy from a direct current supply circuit to a constant voltage alternating current system having a saturable reactor voltage regulating means provided with means to prevent excessive currents in the saturating winding of the saturable reactor.

Briefly stated, the new and improved electric translating system for transmitting energy from a direct current supply circuit to a constant voltage alternating current load circuit comprises an inverter having a transformer, a pair of capacitors connected in parallel across the primary winding of the transformer, and a pair of electric valves connected between opposite sides of the primary winding and the direct current supply circuit. The system also includes a saturable reactor having a reactive winding connected across the primary winding and a saturating winding supplied with a direct current which varies in accordance with the voltage of the load circuit. In order to prevent the current in the saturating winding from exceeding a predetermined limit, relay means responsive to the current in the saturating winding are provided to disconnect one of the capacitors from the primary winding when the current in the saturating winding exceeds the predetermined limit.

For a better understanding of the invention, reference may be had to the following description taken in connection with the accompanying drawing, and its scope will be pointed out in the appended claims. The single figure of the accompanying drawing illustrates diagrammatically a preferred embodiment of the invention.

Referring now to the single figure of the drawing, the electric translating system transmits energy from a direct current supply circuit 10 to an alternating current load circuit 11. The system comprises an inverter 12 having a transformer 13 provided with a primary winding 14. The primary winding has its electrical midpoint 15 connected to one side of the direct current supply circuit 10 and has its end terminals connected to the other side of the supply circuit 10 through electric valves 16 and 17. Electric valves 16 and 17 are each provided with an anode 18, a cathode 19 and a control grid 20, and may be of any of the several types well known in the art although electric valves of the gaseous discharge type are preferred. A pair of commutating capacitors 21a and 21b are connected in parallel across the anodes 18 of the electric valves 16 and 17 and a smoothing reactor 22 is connected between the electrical midpoint 15 and the supply circuit 10. In order to render the electric valves 16 alternately conductive and nonconductive, a transformer 23 is provided which has a primary winding 24 connected to any suitable source of alternating current 25 of a desired frequency. The secondary winding 26 of the transformer 23 has its end terminals connected to control grids 20 of electric valves 16 and 17 and its electric midpoint 27 connected to the cathodes 19 through a current limiting resistance 28.

The general principles of operation of the above described inverter will be well understood by those skilled in the art. In brief, if one of the electric valves, for example the valve 16, is initially rendered conductive, current will flow through the upper portion of winding 14 and electric valve 16 inducing one half cycle of alternating current in secondary windings 29 and 30 of transformer 13. During this interval the capacitors 21a and 21b become charged to substantially twice the potential of the direct current supply circuit 10 and when the potential applied to the control grids 20 by secondary winding 26 reverses polarity to render electric valve 17 conductive, the potential of capacitors 21a and 21b is effective to commutate the current from the valve 16 to the valve 17. Current now flows through the lower portion of winding 14 inducing a half cycle of alternating current of opposite polarity in the windings 29 and 30. In this manner the current is successively commutated between the electric valves 16 and 17 and an electric current is induced in the secondary windings 29 and 30.

In order to control the voltage of the alternating current load circuit 11, the reactive winding 31 of a saturable reactor 32 is connected across the primary winding 14 of the transformer 13. The secondary winding 30 is connected to the saturating winding 33 of the saturable reactor through an electric valve 34 and an electric discharge means 35. Electric valve 34 is a full wave rectifier and comprises a pair of anodes 36 and 37 connected to opposite ends of the secondary winding 30 and a cathode 38. Electric discharge means 35, preferably of the high vacuum type, comprises an anode 39 connected to the cathode 38, a cathode 40, a control grid 41, a screen grid 42 and a suppressor grid 43 which is connected to cathode 40. The anode 39 is connected to the control grid 41 through a resistance 44 and a capacitor 45 to prevent high frequency oscillations of electric discharge means 35. Screen grid 42 is connected to ground through resistance 46 and capacitor 47, through a capacitor 48, and also through a resistance 49.

It can be seen now that saturable reactor 32 and the commutating capacitors 21b and 21a comprise a parallel resonant circuit and that the voltage across primary winding 14 can be varied by changing the impedance of the saturable reactor 32. If the impedance of the saturable reactor 32 is increased, the voltage across the primary winding 14 is increased. As a result, the voltage across the secondary winding 29 is also increased. Conversely, if the impedance of the saturable reactor 32 is decreased, the voltage across the secondary winding 29 is decreased. The impedance of saturable reactor 32 is controlled by varying the conductivity of the electric discharge means 35, the impedance of the saturable reactor 32 varying inversely as the conductivity of the electric discharge means 35.

The control means for varying the conductivity of electric discharge means 35 in accordance with the variations of the voltage of the secondary winding 29 comprises a voltage sensing transformer 50 having a primary winding 51 connected across the secondary winding 29. An electric valve 52 which acts as a rectifier is connected to the secondary winding 53. Electric valve 52 comprises an anode 54, a cathode 55, a suppressor grid 56 which is connected to cathode 55, and a control grid 57 which is connected to the anode 54 through a resistance 58.

Connected across the secondary winding 53 and electric valve 52 is a filter which may comprise a reactor 59, capacitors 60 and 61 and a resistance 62. Also connected across the secondary winding 53 and the electric valve 52 is a voltage divider bridge comprising in series relation a resistance 63 and a glow discharge device 64 which acts as a voltage regulator. A second voltage divider bridge comprising serially connected resistances 65, 66 and 67 is also connected across the secondary winding 53 and the electric valve 52.

A voltage control or voltage adjusting contact 68 connects the resistance 66, through a resistance 69, to the control grid 70 of an electric discharge means 71 to impress on the control grid 70 a potential which varies in accordance with the voltage of the secondary winding 53 and therefore with the voltage of the alternating current load circuit 11. In addition to control grid 70, electric discharge means 71 comprises an anode 72, a cathode 73, a suppressor grid 74 connected to cathode 73, and a screen grid 75 connected to cathode 73 through a resistance 76 and to ground through resistance 77. Electric discharge means 71 is connected in series relation with a resistance 78 across the glow discharge device 64. The common connection or junction 79 of resistance 78 and the anode 72 is connected through a current limiting resistance 80 to the control grid 41 of the electric discharge means 35 to impress a potential on the control grid 41 which varies in accordance with the conductivity of electric discharge means 35.

The common connection or junction 81 of glow discharge device 64 and resistance 63 is connected to the cathode 73 thereby maintaining its potential substantially constant with respect to ground. The potential of control grid 70, however, varies in accordance with the voltage of the voltage divider which comprises the resistances 65, 66 and 67. Thus, when the voltage of the secondary windings 29 and 53 increases, a more negative potential is impressed on the control grid 70 of the electric discharge means 71. The electric discharge means 71 amplifies the change in potential of the grid 70 and causes a more positive potential to be impressed on the control grid 41 of the electric discharge means 35. Electric discharge means 35, therefore, becomes more conductive and transmits more current through saturating winding 33, the impedance of saturable reactor 32 is decreased, and the voltage of the load circuit 11 is decreased. Conversely, when the voltage of secondary windings 29 and 53 is decreased, the conductivity of electric discharge means 35 is decreased and the voltage of load circuit 11 is increased. The voltage of the alternating current load circuit 11 can thus be maintained constant.

The exact value at which the voltage of the load circuit 11 is to be maintained can be set by adjusting the position of the contact 68 on the resistance 66. The position of the contact 68 on the resistance 66 determines the bias on the control grid 70 and, hence, the current flowing in the saturating winding 33 under normal conditions of operations.

During certain operating conditions, as when the electric translating system is started when no load is connected to the load circuit 11, a very large current will be transmitted to saturating winding 33. If currents of such large values are to be permitted to flow through the saturating winding 33, the saturating reactor must be made large enough to allow it to operate under such conditions without suffering damage due to overheating. In order to limit the amount of current which can appear in the saturating winding, the relay contact 81, which connects the capacitor 21b across capacitor 21a, is moved to open position whenever the current in saturating winding 33 exceeds a predetermined value. With the relay contact 81 open, the commutating capacitance of the inverter is decreased and the impedance of the reactive winding 31 must increase to maintain the product of the inductance and the capacitance of the resonant circuit formed by the commutating capacitors 21a and 21b and reactive winding 31 substantially constant in order that the voltage of output circuit 11 be maintained constant. Less current will then be required in saturating winding 32 since the impedance of reactive winding 31 must be greater when the relay contact 81 is in its open position than when it is in its closed position.

The relay contact 81 is moved to its open position by a relay winding 82 when the relay winding 82 is connected across the supply circuit 10 by the normally open relay contact 83 of the relay 84. The relay contact 83 is moved to closed position by the current in the relay winding 85, connected in series with the saturating winding 33, when it exceeds a predetermined high value. Relay 84 must be of a conventional type which requires a greater current in the relay winding 85 to actuate contact 83 to closed position than the current needed in the winding 85 to maintain it in closed position in order that contact 83 remain closed after the current in the saturating winding decreases due to the disconnection of capacitor 21b. Only after the current in the saturating winding falls below a predetermined low value does the contact 83 again move to open position to deenergize relay winding 82 and allow contact 81 to move to its closed position in which it connects the capacitor 21b across the capacitor 21a. In this manner, the capacitor 21b is disconnected from the inverter 12 when the current in the saturating winding exceeds a predetermined high value and it is reconnected only when the current in the saturating winding falls a predetermined degree below the high value so that for a predetermined range of load variation in the load circuit 11 the capacitor 21b will remain disconnected from the inverter 12.

Two relay contacts 81 and 83 are employed in order that the contact 81 be moved very quickly from closed to open position to prevent excessive arcing since relatively large currents circulate through the contact 81 when the contact 81 is in closed position. If the electric translating system transmits only small amounts of energy, the relay winding 85 in series with the saturating winding 33 could be employed to act directly on relay contact 81 since in this case the currents flowing through contact 81 would be of relatively low value.

While the capacitors 21a and 21b and the saturable reactor 32 are shown connected across the primary winding 14 of transformer 13, either the capacitors or the saturable reactor may be connected across the secondary winding 29. Indeed, the apparatus will function if both the saturable reactors and the capacitors across the secondary winding 29. The arrangement illustrated in the drawing is preferred since it permits use of components of minimum size and weight.

While I have shown and described my invention as applied to a particular system of connections and as embodying various devices diagrammatically shown, it will be obvious to those skilled in the art that changes and modifications can be made without departing from my invention and I, therefore, aim in the appended claims to cover all such changes and modifications as fall within the true spirit and scope of my invention.

What I claim as new and desire to secure by Letters Patent of the United States is:

1. In combination: a direct current supply circuit; an alternating current load circuit; an energy translating means comprising an inductive winding; a pair of capacitors connected in parallel across said inductive winding and a plurality of electric valves connected between said direct current supply circuit and said inductive winding; a variable inductance connected across said parallel connected capacitors and comprising a saturating winding with direct current; means responsive to changes in the voltage of said alternating current load circuit for varying the energization of said saturating winding; and relay means responsive to the current in said saturating winding for disconnecting one of said capacitors from the other when the current in said saturating winding exceeds a predetermined value.

2. In combination: a direct current supply circuit; an alternating current load circuit; an energy translating means comprising an inductive winding, a pair of capacitors connected in parallel across said inductive winding and a plurality of electric valves connected between said direct current supply circuit and said inductive winding; a variable inductance connected across said parallel connected capacitors and comprising a saturating winding; an energizing circuit for energizing said saturating winding with direct current; means responsive to changes in the voltage of said alternating current load circuit for varying the energization of said saturating winding; a relay winding connected in series with said saturating winding; and means operatively associated with said relay winding for disconnecting one of said capacitors from said inductive winding when the current in said relay winding exceeds a predetermined value.

3. In combination: a direct current supply circuit; an alternating current load circuit; an energy translating means comprising an inductive winding, a pair of capacitors connected in parallel across said inductive winding and a plurality of electric valves connected between said direct current supply circuit and said inductive winding; a variable inductance connected across said parallel connected capacitors and comprising a saturating winding; an energizing circuit for energizing said saturating winding with direct current; means responsive to changes in the voltage of said alternating current load circuit for varying the energization of said saturating winding; a relay contact in series with one of said capacitors; a relay winding for actuating said relay contact to disconnect said one of said capacitors from said inductive winding;

and means operatively associated with said saturating winding for energizing said relay winding when the current in said saturating winding exceeds a high predetermined value.

4. In combination: a direct current supply circuit; an alternating current load circuit; an energy translating means comprising an inductive winding, a capacitance connected across said inductive winding, and a plurality of electric valves connected between said direct current supply circuit and said inductive winding; a variable inductance connected across said capacitance and comprising a saturating winding; an energizing circuit for energizing said saturating winding with direct current; means for varying the energization of said saturating winding in accordance with the voltage of said alternating current load circuit; and means responsive to the current in said saturating winding for decreasing said capacitance when the current in said saturating winding exceeds a predetermined limit.

5. In combination: a direct current supply circuit; an alternating current load circuit; an energy translating means comprising an inductive winding, a plurality of electric valves connected between said direct current supply circuit and said inductive winding, and a capacitance connected across said inductive winding; a variable inductance connected across said capacitance and having a saturating winding energized by direct current; means for varying the energization of said saturating winding in accordance with the voltage of said alternating current load circuit; and means responsive to the current in said saturating winding for decreasing said capacitance when the current in said saturating winding exceeds a predetermined high value and for increasing said capacitance after a decrease in said capacitance when the current in said saturating winding exceeds a predetermined low value.

6. In combination: a direct current supply circuit; an alternating current load circuit; an energy translating means comprising an inductive winding, a pair of capacitors connected in parallel across said inductive winding and a plurality of electric valves connected between said direct current supply circuit and said inductive winding; a variable inductance connected across said parallel connected capacitors and comprising a saturating winding; an energizing circuit for energizing said saturating winding with direct current; means responsive to changes in the voltage of said alternating current load circuit for varying the energization of said saturating winding; a relay winding connected in series with said saturating winding; and means operatively associated with said relay winding for disconnecting one of said capacitors from said inductive winding when the current in said relay winding exceeds a predetermined value, and for again connecting said one of said capacitors across said inductive winding when the current in said relay winding exceeds a predetermined low value.

7. In combination: A direct current supply circuit; an alternating current load circuit; an energy translating means comprising an inductive winding, a pair of capacitors connected in parallel across said inductive winding and a plurality of electric valves connected between said direct current supply circuit and said inductive winding; a variable inductance connected across said parallel connected capacitors and comprising a saturating winding; an energizing circuit for energizing said saturating winding with direct current; means responsive to changes in the voltage of said alternating current load circuit for varying the energization of said saturating winding; a relay contact in series with one of said capacitors; a relay winding for actuating said relay contact to disconnect said one of said capacitors from said inductive winding; and means operatively associated with said saturating winding for energizing said relay winding when the current in said saturating winding exceeds a high predetermined value, and for de-energizing said winding when the current in said saturating winding exceeds a predetermined low value.

8. In combination: a direct current supply circuit; an alternating current load circuit; an energy translating means comprising an inductive winding, a pair of capacitors connected in parallel across said inductive winding and a plurality of electric valves connected between said direct current supply circuit and said inductive winding; a variable inductance connected across said parallel connected capacitors and comprising a saturating winding; an energizing circuit for energizing said saturating winding with direct current; means responsive to changes in the voltage of said alternating current load circuit for varying the energization of said saturating winding; a relay contact in series with one of said capacitors for connecting said one of said capacitors in parallel with the other of said capacitors; a relay winding for actuating said contact; and a relay responsive to the current in said saturating winding for connecting said relay winding across said supply circuit when the current in said saturating winding exceeds a predetermined value.

9. In combination: a system for translating electrical energy from a direct current circuit to an alternating current circuit including an inductive winding and a plurality of electric valves, a plurality of capacitors normally connected in parallel between said valves; a variable inductance connected across said capacitors having a saturating winding; and means responsive to the current in said saturating winding for disconnecting one of said capacitors when the current in said saturating winding exceeds a predetermined value.

10. In combination: a direct current supply circuit; an alternating current load circuit; an energy translating system comprising a transformer having a primary winding and a secondary winding, a plurality of electric valves connected between said direct current supply circuit and said primary winding, and a pair of capacitors connected across one of said windings; a variable inductance connected across one of said windings and comprising a saturating winding; an energizing circuit for energizing said saturating winding with direct current; means responsive to changes in the voltage of said alternating current load circuit for varying the energization of said saturating winding; a relay contact in series with one of said capacitors for connecting said one of said capacitors in parallel with the other of said capacitors; a relay winding for actuating said contact to open position and a relay responsive to the current in said saturating winding for connecting said relay winding across said supply circuit when the current in said saturating winding exceeds a predetermined value.

11. In combination: a direct current supply circuit; an alternating current load circuit; an energy translating system comprising a transformer having a primary winding and a secondary winding, a plurality of electric valves connected between said direct current supply circuit and said primary winding, and a pair of capacitors connected across one of said windings; a variable inductance connected across one of said windings and comprising a saturating winding; an energizing circuit for energizing said saturating winding with direct current; means responsive to changes in the voltage of said alternating current load circuit for varying the energization of said saturating winding; and relay means responsive to the current in said saturating winding for disconnecting one of said capacitors from the other when the current in said saturating winding exceeds a predetermined value.

12. In combination: a direct current supply circuit; an alternating current load circuit; an energy translating system comprising a transformer having a primary winding and a secondary winding, a plurality of electric valves connected between said direct current supply circuit and said primary winding, and a pair of capacitors connected across one of said windings; a variable inductance connected across one of said windings and comprising a saturating winding; an energizing circuit for energizing said saturating winding with direct current; means responsive to changes in the voltage of said alternating current load circuit for varying the energization of said saturating winding; a relay winding connected in series with said saturating winding; and means operatively associated with said relay winding for disconnecting one of said capacitors from the winding to which one of said capacitors is connected when the current in said relay winding exceeds a predetermined value.

13. In combination: a direct current supply circuit; an alternating current load circuit; an energy translating system comprising a transformer having a primary winding and a secondary winding, a plurality of electric valves connected between said direct current supply circuit and said primary winding, a capacitance connected across one of said windings; a variable inductance connected across one of said windings and comprising a saturating winding; means for varying the energization of said saturating winding in accordance with the voltage of said alternating current load circuit; and means responsive to the current in said saturating winding for decreasing said capacitance when the current in said saturating winding exceeds a predetermined limit.

JAMES RAY GILMER.

REFERENCES CITED

The following references are of record in the file of this patent:

FOREIGN PATENTS

| Number | Country | Date |
|---|---|---|
| 548,223 | Germany | Apr. 14, 1932 |